May 7, 1957  J. A. WICKSTROM  2,791,189
PERFORATED PAPER COOKIE CONVEYER
Filed April 12, 1954  2 Sheets-Sheet 1
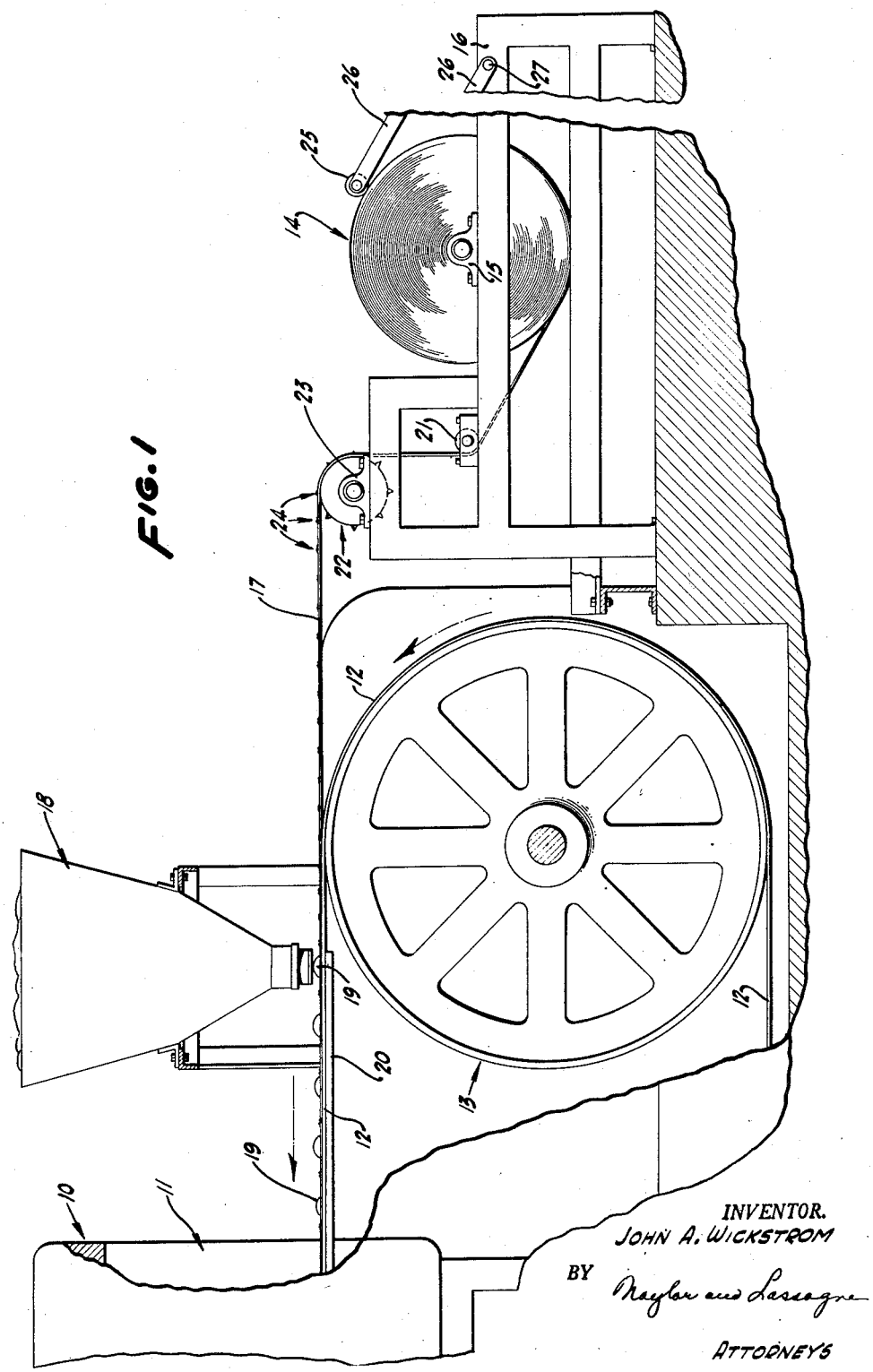
INVENTOR.
JOHN A. WICKSTROM
BY
ATTORNEYS May 7, 1957  J. A. WICKSTROM  2,791,189
PERFORATED PAPER COOKIE CONVEYER
Filed April 12, 1954  2 Sheets-Sheet 2
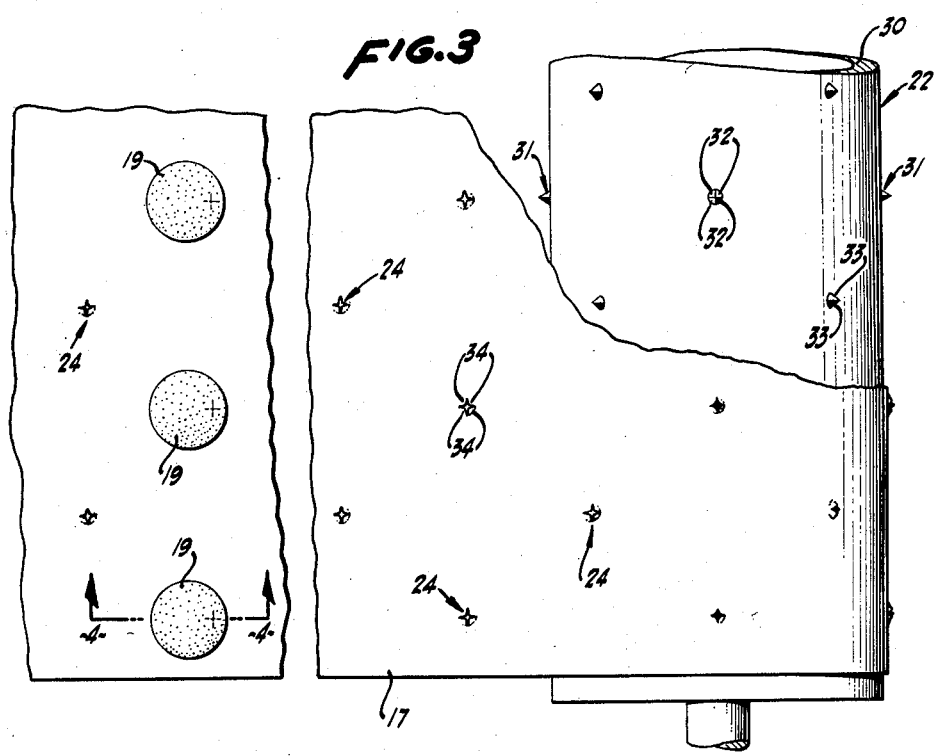
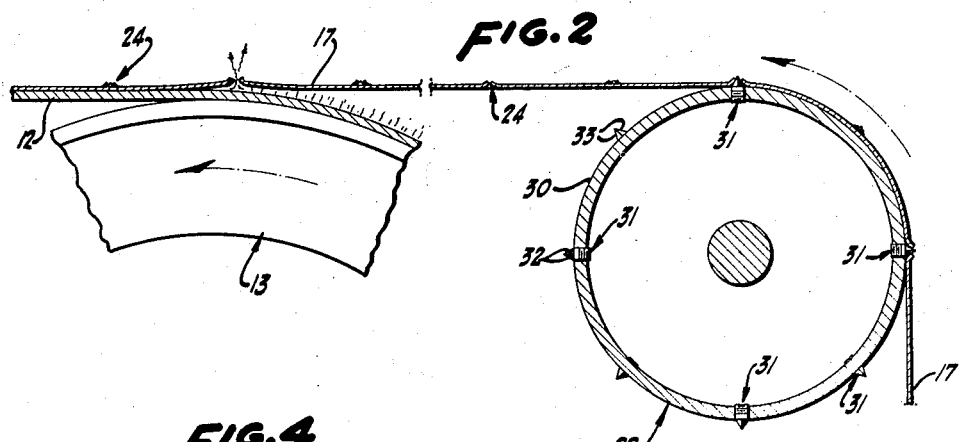
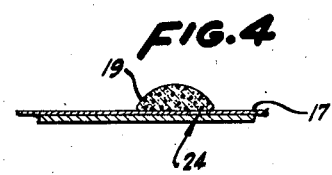
INVENTOR.
JOHN A. WICKSTROM
BY *Naylor and Lassagne*
ATTORNEYS

United States Patent Office 2,791,189
Patented May 7, 1957

2,791,189
PERFORATED PAPER COOKIE CONVEYER

John A. Wickstrom, San Francisco, Calif., assignor to Mother's Cake & Cookie Co., Oakland, Calif., a corporation of California Application April 12, 1954, Serial No. 422,579

3 Claims. (Cl. 107—57)

This invention relates to improvements in carriers for baking ovens and more particularly to an improved apparatus for conveying cookies, pastries, and other bakery products through an oven of the continuously operating type.

In baking ovens, a continuous conveyor such as an endless band or strip of metal is often provided to convey the bakery products through the oven during the baking operation and it has heretofore been proposed to deposit the dough of such bakery products on a thin strip or web of disposable material rather than directly on the metallic conveyor. The disposable material, such as paper or the like, is, in turn, supported on and conveyed through the oven by means of the metallic conveyer which serves, in cooperation therewith, as a moving baking surface or hearth with the disposable material preventing the dough of the bakery products from adhering to the metallic conveyor during the baking operation. The baked products are then removed from the disposable material in a suitable manner, as, for example, in the manner disclosed in my pending application Ser. No. 408,704, filed February 8, 1954, entitled, Method and Apparatus for Removing Bakery Products From a Continuous Conveyor.

In the past, such ovens have often proved unsatisfactory since small quantities of air are invariably entrained and/or trapped between the strip of disposable material and the flat metallic conveyor with the result that as such air later expands due to the heat of the oven during baking operation, portions of the disposable material are caused to rise up on the metallic conveyor in the form of mounds or bubbles and the bakery products on the disposable conveyor are distorted by the resulting uneven supporting surface. Several attempts have, heretofore, been made to remedy this defect but, to my knowledge, none of such attempts have proved particularly satisfactory and/or commercially practicable.

The above-noted defect as well as other defects of the prior art are remedied in accordance with the improved conveying apparatus of the present invention wherein the web of disposable paper-like material is provided with a pattern of valving perforations which are adapted to freely pass air entrained between the disposable material and the endless metallic conveyor and to exclude the doughy material of the bakery product from access to the metallic conveyor should such dough be deposited on one or several of the valving perforations. More specifically, the web of disposable paper-like material is provided with a pattern of valving perforations, each of which includes at least one tongue-shaped valving member formed in the surface of the web by one or more slits in the paper-like material thereof. In this respect, and in accordance with a preferred embodiment of the invention, it has been found that such valving perforations should preferably include four tongue-shaped valving members which are formed in the paper material, as for example the type used in printing newspapers, by a pair of crossed slits intersecting each other at substantially right angles at their midpoints.

In addition to the foregoing, the present invention further contemplates the provision of a perforating means which may be disposed in the path of the web of paperlike material as it is fed from a supply roll to the endless conveyor of an oven of the continuously operating type and which is arranged and adapted to engage and slit the paper-like material of the web to provide the aforedescribed pattern of valving perforations continuously along its surface.

The above as well as other novel features and advantages of the present invention will be more readily understood from the following description of the accompanying drawings illustrating the invention in accordance with a preferred embodiment, in which drawings:

Figure 1 is a side view in elevation, partly in section, showing a preferred embodiment of the present invention;

Figure 2 is a partial sectional view in elevation showing the path of the web of paper-like material in relation to the perforating cylinder and the initial supporting portion of the endless metallic conveyor;

Figure 3 is a partial plan view of a segmented longitudinal portion of the path of the web of paper-like material showing the relation of the valving perforations provided by the perforating cylinder and the deposit of bakery products thereon.

Figure 4 is a sectional view in elevation taken along line 4—4 of Figure 3.

Referring now to Figure 1 of the drawings, there is illustrated the charging end portion of a baking oven 10 of the continuously operating type which, as shown, is provided with a longitudinally extending tunnel or heat zone 11 and with an endless conveyor 12 mounted between a drum 13 and a second drum, not shown, at the opposite or discharge end of the oven. One or both of the drums may be driven by a suitable means such that the conveyer 12 will, in its upper path of travel, be caused to move at a selected rate of speed through the heat zone 11 in the direction indicated by the arrows. The heat zone 11 is provided with suitable heating means as, for example, a series of transverse burners located in longitudinally spaced relation below the upper path of travel of the conveyor 12 and with a second series of direct or radiant heat emitting burners located above the path of the conveyor 12, equidistantly spaced along the length of the heat zone 11 in staggered relation with respect to the under burners.

When ovens of the above and conventional type are used to bake products in which the unbaked dough or material thereof has a relatively high liquid content in which sugar and/or other ingredients of the dough are dissolved, it has heretofore been proposed to employ a web of disposable material to prevent the dough of the bakery products from contacting and adhering to the metallic conveyer 12 during the baking operation. For this purpose a supply roll of paper-like material 14 is usually mounted in the manner shown adjacent to the conveyor drum 13. The supply roll 14 may be rotatably supported in bearings 15 mounted on a frame 16 and the web 17 of paper-like material is fed therefrom directly to the metallic conveyor 12 which conveys the same in superimposed relationship beneath a dough depositor 18 and then through the heat zone 11 of the oven 10. The dough depositor 18 may be of any suitable type which, for the purpose of disclosure, is here indicated as an automatic cookie depositor adapted to continuously deposit the doughy material 19 of a cookie product onto the upper surface of the web 17. A supporting plate or stationary hearth 20 may be provided which extends in the manner shown from a position slightly to the right of the discharge nozzle of dough depositor 18 into the heat zone 11 of the oven.

As mentioned hereinbefore, air is invariably entrained and trapped between the web 17 and the metallic conveyer 12 and the web 17 is in accordance with the present invention provided with a pattern of air discharge perforations which serve to pass freely or discharge such air while excluding the doughy material of the bakery product 19 from access to the supporting metallic conveyer 12, should such dough be deposited on one or more of the perforations. In this respect, I have found that such an air discharge perforation may be provided by means of a pattern of valving-type perforations each of which includes at least one tongue-shaped valving member formed in the surface of the web by slitting the paper-like material thereof. The tongue-shaped valving member serves, due to the inherent flexibility of the paper-like material, as a flap-valve which will permit the entrained or trapped air to escape upwardly through the valving member and, in the event that doughy material is deposited thereon, will collapse to provide a substantially continuous supporting surface which will exclude such material from access to the under supporting surface of the metallic conveyer 12. While each of the valving perforations may, in accordance with my invention, include one or more tongue-shaped valving members, I have found that in the usual case wherein the web comprises a relatively thin sheet of paper, as for example of the type used in the printing of newspapers, it is preferable that each of the valving perforations include four tongue-shaped valving members formed in the surface of the web by means of crossed slits which intersect each other at right angles at their midpoints.

In accordance with the foregoing and referring now to the preferred embodiment of the present invention illustrated, the web 17, of paper material of the type used in printing newspapers, is passed from the supply roll 14 around a freely rotatable guide roller 21 and thence in a substantially vertical direction to a freely rotatable perforating drum, generally designated as 22. As will be observed, the web 17 contacts the perforating drum 22 through a path of travel equal to approximately 90° of the circumference of the drum 22 and upon leaving the drum 22 passes in a substantially horizontal direction to the endless metallic conveyer 12 with its lower surface in the same plane as that of the upper path of travel provided by the metallic conveyer 12. The perforating drum 22 is rotatably supported in the bearings 23 mounted on the frame 16 and serves, as will be described in detail hereinafter, to slit the paper-like material of the web 17 in a pattern of valving perforations, generally designated as 24, along its surface. A gravity-type friction roller 25 is provided to maintain a tension on the web 17 during its path of travel from the supply roll 14, around the guide roller 21 and perforating drum 22, and to the metallic conveyer 12. The roller 25 is rotatably supported between the free ends of a pair of laterally spaced arms 26 which are pivotally mounted at 27 on the frame 16.

As shown in detail in Figures 2 and 3, the perforating drum 22 comprises a cylinder 30 on which there is mounted a plurality of radially extending perforating projections 31 which are adapted to engage the web 17 and to slit the paper-like material thereof to form a pattern of valving perforations 24 along the surface of the web. The perforating projections 31 may be mounted on the circumference of the cylinder 30 in any suitable manner as, for example, as shown in Figure 2 wherein each of the projections 31 is provided with a threaded shank which is screwed into a correspondingly threaded hole provided in the wall of the cylinder 30. As will be observed, the projections 31 are pointed and are so formed with four identical triangular-shaped sides 32 as to provide four sharp cutting or knife-like edges 33 located at intervals of 90° around the circumference of each projection. By such construction, as the web 17 of paper is moved through the path provided by the circumference of the cylinder 30 through 90° rotation, the point of each pin will first pierce or slit the paper, and the paper will on further movement of the web 17 then be further slit by the knife edges 33 to provide four angular shaped valving tongues 34. Moreover, as the projections 31 thus engage and slit the web 17, the projections 31 will, while so engaged in the valving perforations, cause the cylinder 30 to rotate with the movement of the web 17 as it is drawn through the heat zone 11 of the oven 10 by the metallic conveyer 12 and the perforating cylinder 22 will thus continuously rotate therewith to provide a pattern of valving perforations along the surface of the web 17.

As shown in Figure 2, the angular shaped valving tongues 34 of each of the valving perforations 24 may project, due to the resilient nature of the paper, in a slightly upward direction towards the center of the perforation and as further shown in Figure 2, will freely pass air entrained between the web 17 and the metallic conveyer 12 as the same are engaged in superimposed relation. In the event that some air should, nevertheless, become trapped between the web 17 and the metallic conveyer 12, such air may freely escape through one or more of such valving perforations 24 when and as it expands from the heat of the oven, and the web 17 will, therefore, at all times remain in flat contact with the supporting metallic conveyer 12.

As shown in Figure 3, should the dough of the bakery product 19 be deposited on one or more of the valving perforations 24, the four angular-shaped valving tongues 34 will collapse to provide a substantially continuous supporting surface for the products and thus will exclude the dough thereof from access to the metallic conveyer 12. In this respect it should be noted that the pattern of valving perforations 24 in the surface of the web 17 should be such that sufficient valving perforations will remain free after the dough of the bakery products are deposited thereon to permit, as described above, the escape during the baking operation of any air trapped between the web 17 and the metallic conveyer 12.

Having now described my invention according to its preferred embodiment, what is claimed is:

1. In a bakery oven of the continuously operating type, the combination with an imperforate continuous metallic conveyor arranged to convey products to be baked through a heat zone of the oven on a disposable web of paper-like material adapted to be superimposed upon said metallic conveyor and to receive the doughy material of the products to be baked upon its upper surface, said web being provided with a pattern of valving perforations adapted to freely pass air entrained between said web and said metallic conveyor while substantially excluding doughy material deposited on any of said valving perforations from access to said metallic conveyor, and means for perforating said web to provide said pattern of valving perforations therein and feeding said web through the heat zone of said oven in superimposed relationship with said metallic conveyor, each of the valving perforations in the disposable web of paper-like material being comprised of four tongue-shaped valving members formed in the surface of the web by crossed slits in the paper-like material, said slits intersecting each other at substantially right angles at their mid-points.

2. In a bakery oven of the continuously operating type, the combination with an imperforate continuous metallic conveyor arranged to convey products to be baked through a heat zone of the oven on a disposable web of paper-like material obtained from a supply roll thereof, means for feeding said paper-like material in the form of a web from said supply roll in a continuous path through said oven heat zone in superimposed relationship with said metallic conveyor, means disposed above the path of said web for depositing the doughy material for the products to be baked on the upper surface of said web, and means disposed in the path of said web between said supply roll and said dough depositing means arranged to engage the paper-like material of the web and to provide a pattern of valving perforations therein, said perforating means including a rotatable cylindrical member having a plurality of radially outwardly extending projections around its circumferential surface, each of said projections being adapted to slit the paper-like material of said web to provide a valving perforation having a plurality of angular-shaped tongues arranged to freely pass air entrained between said web and said metallic conveyor and to exclude doughy material from access to said metallic conveyor when deposited on said angular-shaped tongues of said valving perforation.

3. The combination according to claim 2 wherein each of the perforating projections of the cylindrical member is adapted to form crossed slits in the paper-like material of the web, said slits intersecting each other at substantially right angles at their mid-points and forming four substantially identical angular-shaped tongues.

References Cited in the file of this patent

UNITED STATES PATENTS

| | | |
|---|---|---|
| 762,321 | Keyes | June 14, 1904 |
| 2,503,771 | Roll | Apr. 11, 1950 |
| 2,700,939 | Liston | Feb. 1, 1955 |

FOREIGN PATENTS

| | | |
|---|---|---|
| 276,061 | Great Britain | Sept. 15, 1927 |